US006671572B1

(12) United States Patent
Craft et al.

(10) Patent No.: US 6,671,572 B1
(45) Date of Patent: Dec. 30, 2003

(54) METHOD AND COMPUTER PROGRAM FOR AUTOMATED DESIGN AND MANUFACTURE OF CUSTOM WORKHOLDING FIXTURES REQUIRING MACHINING OF SUBSTANTIALLY UNIQUE MOUNTING GEOMETRIES

(75) Inventors: Roger L. Craft, Emporia, KS (US); Frank Michael Nye, Overland Park, KS (US); Stan Kroeker, Emporia, KS (US)

(73) Assignee: Agile Technology Partners, LLC, Bakersfield, CA (US)

( * ) Notice: Subject to any disclaimer, the term of this patent is extended or adjusted under 35 U.S.C. 154(b) by 0 days.

(21) Appl. No.: 10/192,486

(22) Filed: Jul. 9, 2002

(51) Int. Cl.[7] .............................................. G06F 19/00
(52) U.S. Cl. ..................... 700/184; 700/117; 700/180; 29/33 P; 345/700
(58) Field of Search ........................... 700/90, 117, 159, 700/179–182, 184; 29/33 P; 708/440, 811; 345/700

(56) References Cited

U.S. PATENT DOCUMENTS 3,981,786 A * 9/1976 Andrews ............... 204/224 M
4,685,661 A * 8/1987 Slocum et al. ................ 269/20
6,094,793 A * 8/2000 Szuba ........................ 29/33 P

* cited by examiner

Primary Examiner—Jayprakash N. Gandhi
(74) Attorney, Agent, or Firm—Hovey Williams LLP

(57) ABSTRACT

A method and computer program providing for substantially automated CAD/CAM design and manufacture of custom workholding fixtures used to locate and secure workpieces on which work, such as, for example, machining, welding, or assembly, is to be performed, wherein computer models of support structures and locating and clamping devices, including dimensions and mounting geometries associated therewith, facilitate development and testing of a workholding concept, production of fixture drawings, and generation and formatting of a corresponding control program for controlling a CNC or CAM machine for manufacturing the fixture.

18 Claims, 5 Drawing Sheets

METHOD AND COMPUTER PROGRAM FOR AUTOMATED DESIGN AND MANUFACTURE OF CUSTOM WORKHOLDING FIXTURES REQUIRING MACHINING OF SUBSTANTIALLY UNIQUE MOUNTING GEOMETRIES

BACKGROUND OF THE INVENTION

1. Field of the Invention

The present invention relates to methods and computer programs for automated design and manufacture of custom workholding fixtures or other similar objects requiring machining of substantially unique mounting geometries. More particularly, the present invention concerns a method and computer program providing for substantially automated CAD/CAM design and manufacture of custom workholding fixtures used to locate and secure workpieces or other items on which work, such as, for example, machining, welding, or assembly, is to be performed, wherein computer models of support structures and locating and clamping devices, including dimensions and mounting geometries associated therewith, facilitate development and testing of a workholding concept, production of fixture drawings, and generation and formatting of a corresponding control program for controlling a machine for manufacturing the fixture.

2. Description of the Prior Art

It is often desirable to create a custom workholding fixture to locate and clamp, hold, or otherwise secure parts, workpieces, or other items on which it is desired to perform manufacturing operations such as, for example, machining, welding, or assembly. Unfortunately, developing such a workholding fixture, from design to actual manufacture, can be a slow, expensive, and generally inefficient process.

Presently, fixture creation begins with development of a "workholding concept" or strategy for holding the workpiece during the manufacturing operations. A common method starts with a support or base structure, typically including, for example, a horizontal mounting plate, a tower structure, an angle plate, a window structure, and other support structures. A designer selects and arranges one or more locating and clamping devices in a manner sufficient to adequately and safely locate and secure the workpiece on the support structure. Such selection and arrangement is made with hard-won experience and is based on such considerations as, for example, the specifications and characteristics of the workpiece, the devices, and the support structure; the particular application and operations to be performed on the workpiece; and the particular circumstances surrounding those operations.

As will be appreciated by those with skill in the art, development of the workholding concept is a custom process for each different workpiece. There are no set standards, meaning every person engaged in this type of work may do things differently. Thus, with little or no standardization, the process can require considerable knowledge and experience in designing and in developing workholding concepts, and can include substantial risks of costly and time-consuming human errors.

Once the workholding concept is complete, it must be implemented to produce the actual workholding fixture. First, detailed design drawings must be produced by a fixture drawing draftsperson, wherein is shown and identified each locating and clamping device in its proper position on the support structure. The drawings must also show and dimension each device's mounting geometry, including, for example, fastening features or hole patterns, with which the device will be secured to the support structure. Furthermore, all of the mounting geometries usually are dimensioned referenced to a common locating axis on the support structure for manufacturability purposes. If, during production of the drawings, insufficient clearances between devices, the support structure, and the workpiece are discovered, the workholding concept must be re-designed so as to avoid the interference or other problem.

Next, a computer numerical control (CNC) program must be developed by a CNC programmer. The CNC program is based upon the workholding concept and upon the workholding fixture drawings and is therefore similarly unique to each fixture. The CNC program provides the machine code needed to direct a CNC machine to manufacture the support structure, including milling, drilling and tapping or otherwise implementing the mounting geometries for the devices. Additionally, the CNC programmer will develop a tooling list which identifies all tools needed and will group similar steps or steps involving similar tools so as to streamline preparation work by reducing or eliminating redundant or otherwise inefficient or wasteful actions.

Next, a machine operator, using the fixture drawing and the CNC program, prepares the machining operation for making the support structure. This includes verifying the CNC program by loading any required tooling and carefully stepping through the machining of each workpieces' mounting geometry to ensure that each will be properly made in accordance with the fixture drawing. Typically, there will be only one unique support structure made for each type of workpiece to be held, regardless of the total number of workpieces, necessitating that every step from development of the workholding concept, production of the fixture drawing, programming of the CNC program, and machining of the support structure be absolutely correct or else every instance of the workpiece will be improperly manufactured.

Once the support structure is completed, the various locating and clamping devices can be mounted, after which the support structure is ready to hold the workpiece for the machining, welding, or assembly process.

It will be appreciated that this process is slow, inefficient, and fraught with potential for error. Typically, four skilled people are involved, including the workholding concept designer, the fixture drawing draftsman, the CNC program programmer, and the machine operator. Lead time from start to finish can easily reach or exceed four weeks. Errors committed at any point in the process can be carried through and possibly magnified, and may not be discovered until the support structure is assembled and the workholding devices cannot be properly mounted because of incorrect hole patterns, or, in some cases, the hole patterns may be correct but the workholding device placement may be wrong. Where errors are found, it may be possible to fill incorrect holes and redrill the support structure rather than start anew, though, in either case, time and money is lost.

Due to the above-identified and other problems and disadvantages in the art, a need exists for an improved process for designing and manufacturing custom workholding fixtures.

SUMMARY OF THE INVENTION

The present invention provides a distinct advance in the art of methods and computer programs for automated design and manufacture of custom workholding fixtures or other similar objects requiring machining, fabricating, or assembling of substantially unique mounting geometries. More particularly, the present invention provides a method and computer program for substantially automated CAD/CAM design and manufacture of custom workholding fixtures used to locate and secure workpieces on which work, such as, for example, machining, welding, or assembly, is to be performed, wherein computer models of support structures and locating and clamping devices, including dimensions and mounting geometries associated therewith, facilitate development and testing of a workholding concept, production of fixture drawings, and generation and formatting of a corresponding control program for controlling a CNC machine for manufacturing the workholding fixture.

In a preferred embodiment, the present invention is embodied in a computer program stored on and executed by a system comprising a substantially conventional computing device coupled with and operable to direct and control the substantially conventional CNC machine to machine the workholding fixture. The workholding fixture comprises the support structure and one or more of the workholding devices, which may be, for example, swing clamps, work supports, special use clamps, edge clamps, or collet vises, of an electric, hydraulic, or manual nature.

In a preferred embodiment, the computer program supplements existing CAD software, and broadly comprises code segments relating to one or more workholding fixture templates; one or more predefined libraries of support structures, device models, and associated processes; one or more user defined features (UDFs); a CNC post processor; and one or more iconic macros. The fixture templates are provided to facilitate standardization in and streamlining of the design process. The templates can be preset with operation parameters, manufacturing parameters, work cell definitions, tooling definitions, PPRINT settings, and any other settings that may have to be performed with each new CNC program. Thus, rather than beginning each new workholding fixture design from scratch, a user may choose to begin with an existing template and change parameters and otherwise adapt it as needed.

The libraries contain a plurality of computer models or virtual embodiments of a variety of support structures and locating and clamping devices, as well as their associated dimensions and mounting geometries. This allows the user to simply select a desired support structure and one or more desired devices from the library. Because the dimensions and mounting geometries are represented in the models, the computer program is able to facilitate checking for tolerances, clearances, and interferences.

The UDFs are used to capture design and manufacturing intent in a form that can be applied to new designs. Some UDFs are associated with design processes and are used to automatically populate the fixture model with the selected clamping device's mounting geometry, including, for example, tapped holes, clearance holes, threaded holes, and other features. Other UDFs are associated with manufacturing processes and are used to automatically generate the CNC program required to machine the mounting geometry into or onto the support structure.

A CNC Post Processor is used to output the correctly formatted or otherwise adapted CNC program code for the particular type or brand of CNC machine being used to machine the workholding fixture, thereby allowing the present invention to accommodate a variety of different CNC machines.

The iconic macros are a graphical user interface (GUI) provided to streamline the design and CNC program generation processes. Electronic selection of these icons, as with, for example, a computer mouse or pointer, results in initiation of a corresponding function.

In use and operation, the present invention functions as follows. First, just as in the prior art, a workholding concept must be developed for locating and securing the workpiece. In the present invention, such development is substantially streamlined through computer-based automation using virtual components and simulations. For example, in one embodiment, an appropriate fixture template may be selected to provide a convenient starting point from which to continue the design process.

Thereafter, selection of an appropriate computer-modeled or virtual support structure may be made from a display of a variety of such support structures. Then, selection of one or more appropriate computer-modeled or virtual locating or clamping devices may be made from a display of a variety of such devices. Once selected, the device can be positioned on the selected support structure in a manner sufficient to adequately and safely locate and secure the workpiece. The appropriateness of such choices may be tested immediately and definitively so that, if necessary, a substitution may be made before any further progress in the process occurs.

The devices are modeled using a modeling standard under which all mounting holes may be defined as members of a hole pattern, which reduces the number of user defined features (UDFs). Each UDF can initially be placed referencing a lead member of the hole pattern, and automatically apply itself to the remaining members of the hole pattern. If a standard hole pattern cannot be used to represent an irregular placement of the hole pattern members, then hole pattern tables are used. Furthermore, the lead member of each hole pattern will contain or otherwise be associated with a name or other identifier that describes the type of hole. This feature aids the computer program later in creating the CNC program.

Additionally, as mentioned, all models of clamping or otherwise movable devices will contain appropriate parameters and relations to allow the computer program to check for proper clearances and interferences. Additionally, where applicable, each model will contain features which represent, for example, the point of clamping contact, and which can be used to more easily position the device. Additionally, the computer program uses design variation tables whenever possible, which, it will be appreciated, allows the user to easily replace devices to review a number of design scenarios.

Next, fixture drawings must be produced. Because development of the workholding concept is computerized and integrated with CAD software, rapid and efficient development and testing of the workholding concept is possible along with simultaneous production of the fixture drawings of the finalized concept. Thus, these steps are advantageously and efficiently combined.

The CNC program operable to implement the verified workholding concept must then be generated. Generation of the CNC Program is automatic and performed by the computing device based upon the selected models, their dimensions and mounting geometries, and the fixture drawings.

In the present invention, verification of the CNC code can be minimized because it results from the tested workholding concept. Nevertheless, provision for verification is made in the form of displayable simulated tool motion corresponding to the CNC program. Thus, the CNC program is easily verified without needing to involve the CNC machine itself. This is particularly advantageous where the CNC machine is located remotely from where the CNC program is generated.

Once the CNC program is generated, the CNC post processor formats or otherwise adapts it for the particular CNC machine being used.

In another embodiment of the invention, a user may select a workpiece and one or more clamping devices to hold the workpiece before selecting an appropriate support structure. Specifically, the user first selects and displays a workpiece and then selects and displays one or more clamping devices to hold the workpiece. A support structure is then selected on which to mount the clamping devices and workpiece.

It will be appreciated that the present invention provides a number of substantial advantages over the prior art. For example, whereas the prior art process is slow, inefficient, and fraught with potential for human error, the present invention advantageously maximizes efficiency and minimizes or eliminates error risks by substantially automating and computerizing a great deal of the workholding fixture design and manufacturing process. Furthermore, whereas the prior art process usually requires the involvement of at least four people, including the workholding concept designer, the fixture drawing draftsman, the CNC programmer, and the machine operator, the present invention advantageously and efficiently combines development of the workholding concept with production of the fixture drawings and generation of the machine program, thereby eliminating the draftsman and the programmer and requiring, at most, only two people. This substantial simplification allows for the desirable participation of third-parties, such as customers, in the design and manufacturing process. Additionally, whereas lead time for the prior art process could easily reach or exceed four weeks (not including time required to correct errors), the present invention advantageously reduces lead time to a few days, thereby reducing the design-to-build time by as much as 80%.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
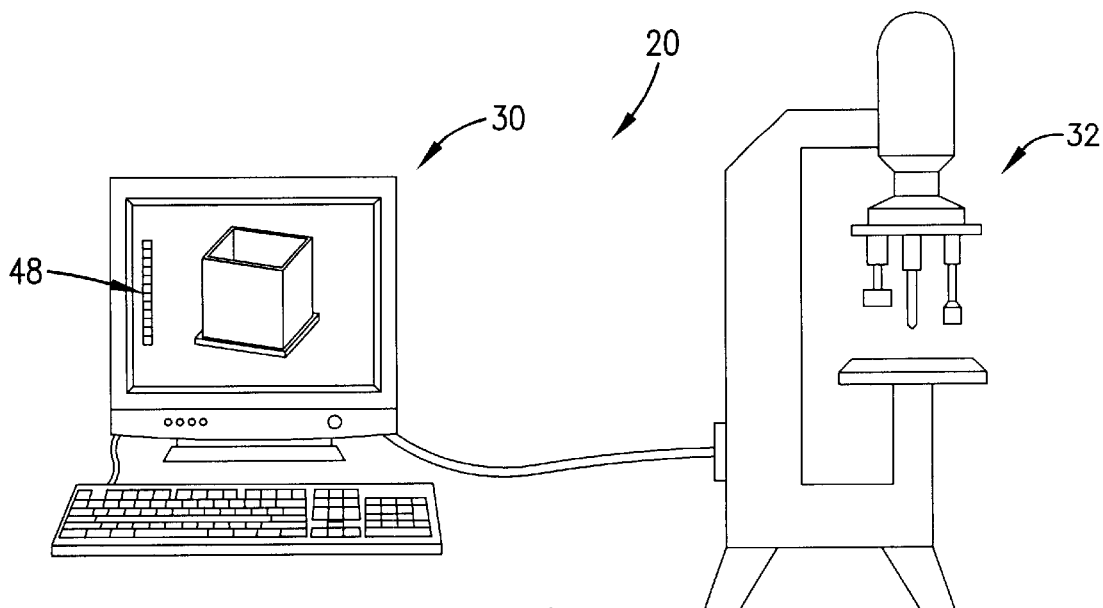
FIG. 1 is a depiction of a system useful for implementing a preferred embodiment of the present invention.

Referring to the figures, a system 20 is shown constructed in accordance with a preferred embodiment of the present invention. The system 20 is operable, in combination with a computer program described herein, to provide for substantially automated CAD/CAM design and manufacture of a custom workholding fixture 22 used to locate and secure parts, workpieces, or other workpieces 24 on which work, such as, for example, machining, welding, or assembly, is to be performed. The computer program includes computer or virtual models of a variety of support structures 26 and a variety of locating and clamping devices 28, including dimensions and mounting geometries associated therewith, which facilitates development and testing of a workholding concept, production of fixture drawings, and generation of a CNC program for directing or controlling a CNC machine 32 for manufacturing the fixture 22.

The present invention is described herein as being adapted for use with Pro/Engineer 3-D CAD/CAM software, currently available from Parametric Technology Corporation, which includes a basic Pro/NC-MILL package supporting three-axis milling. This package typically contains a number of modules, including Pro/Assembly, Pro/Detail, Pro/NC-Mill, Pro/Plot, Pro/Report, Pro/Surface. The present invention is not, however, limited to this particular software or package, being instead readily adaptable for use with other similar software, including many existing CAD programs using parametric tools or solid geometry.

As illustrated, referring particularly to FIG. 1, the system 20 broadly comprises a computing device 30 and the CNC machine 32. The computing device 30 may be any substantially conventional computer, such as, for example, a personal desktop or laptop computer as is currently available from computer makers Dell Computer Corporation, Gateway Inc., IBM Corp., and Compaq Computer Corp., operable to store and execute the computer program of the present invention. Similarly, the CNC machine 32 is a substantially conventional automated milling machine operable to receive the CNC program generated by the computer program of the present invention and, under the direction and control thereof, machine the fixture 22.

Figure 2:
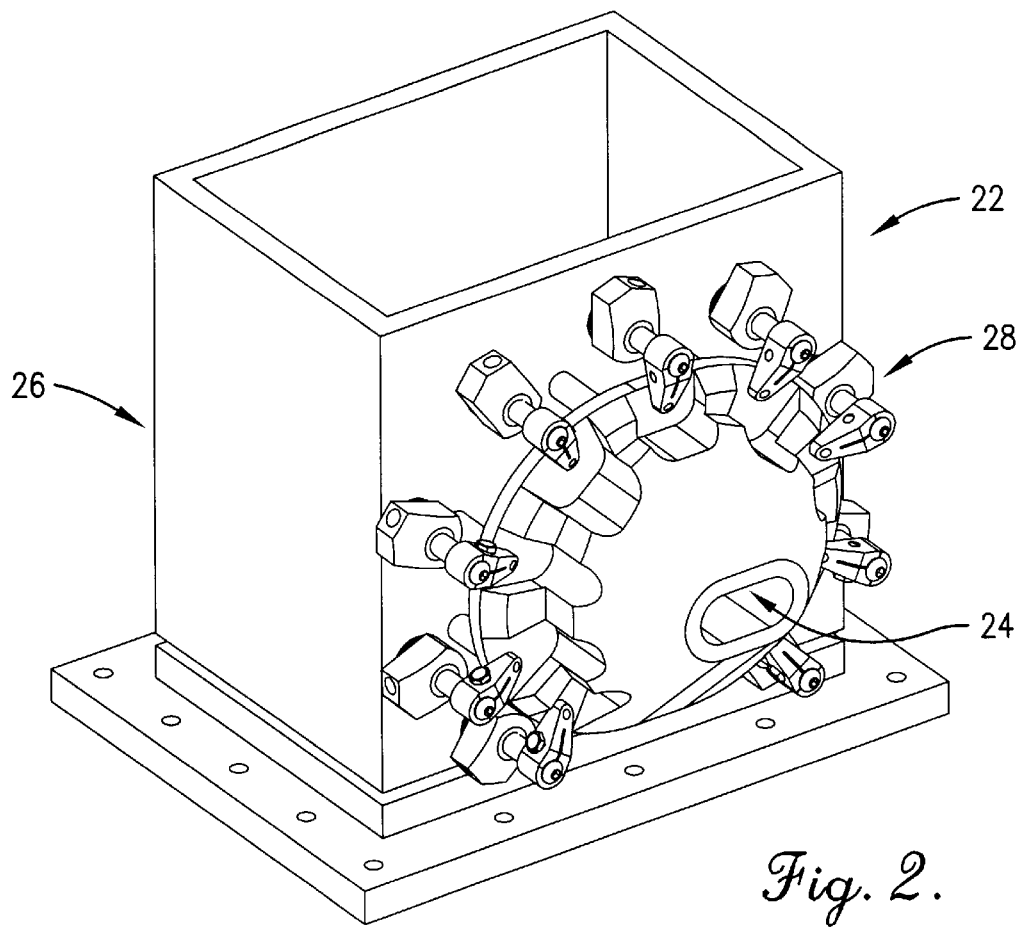
FIG. 2 is an isometric view of a workholding fixture with a plurality of workholding devices securing a workpiece thereto, wherein design and manufacture of the workholding fixture is a result of the present invention.
Figure 3:
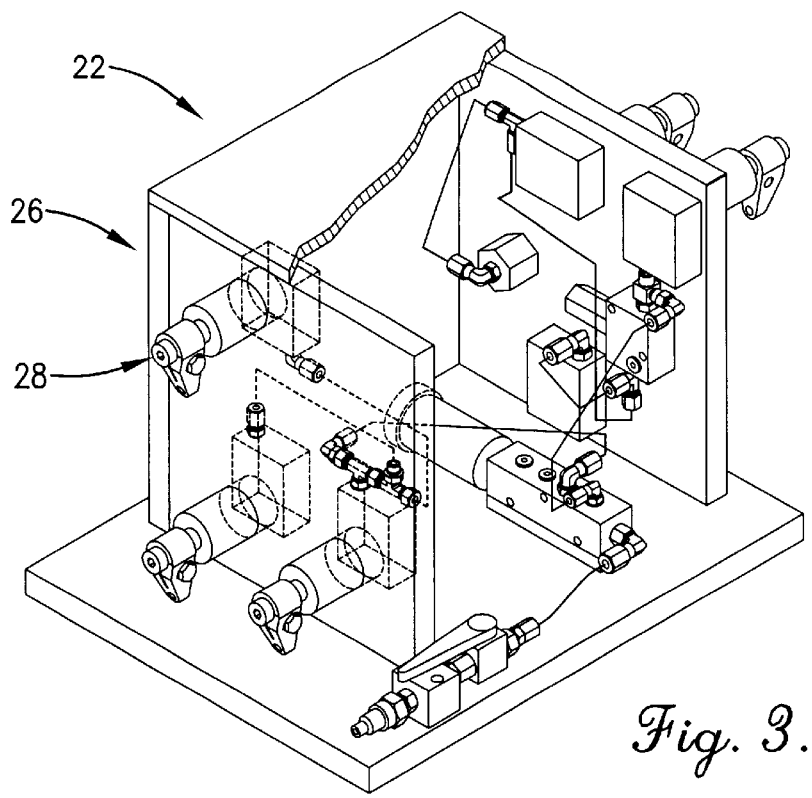
FIG. 3 is a fragmentary isometric view of a workholding fixture similar to that shown in FIG. 2, wherein is shown the complexity and relationships of operation of the workholding devices.

Referring also to FIGS. 2 and 3, the fixture 22 comprises the support structure 26 and the devices 28, which are shown in an exemplary operational relationship wherein the devices 28 function to locate and secure the workpiece 24 upon the support structure 26 so that the workpiece 24 may be safely and properly worked upon. Those with ordinary skill in the art will appreciate that a variety of support structures 26 exist or may be created, with many, for example, including a horizontal mounting plate, a tower structure, an angle plate, a window structure, or other similar components. The present invention is unconcerned with the nature or form of the support structure 26 so long as a computer or virtual model thereof may be created and stored electronically.

Figure 4:
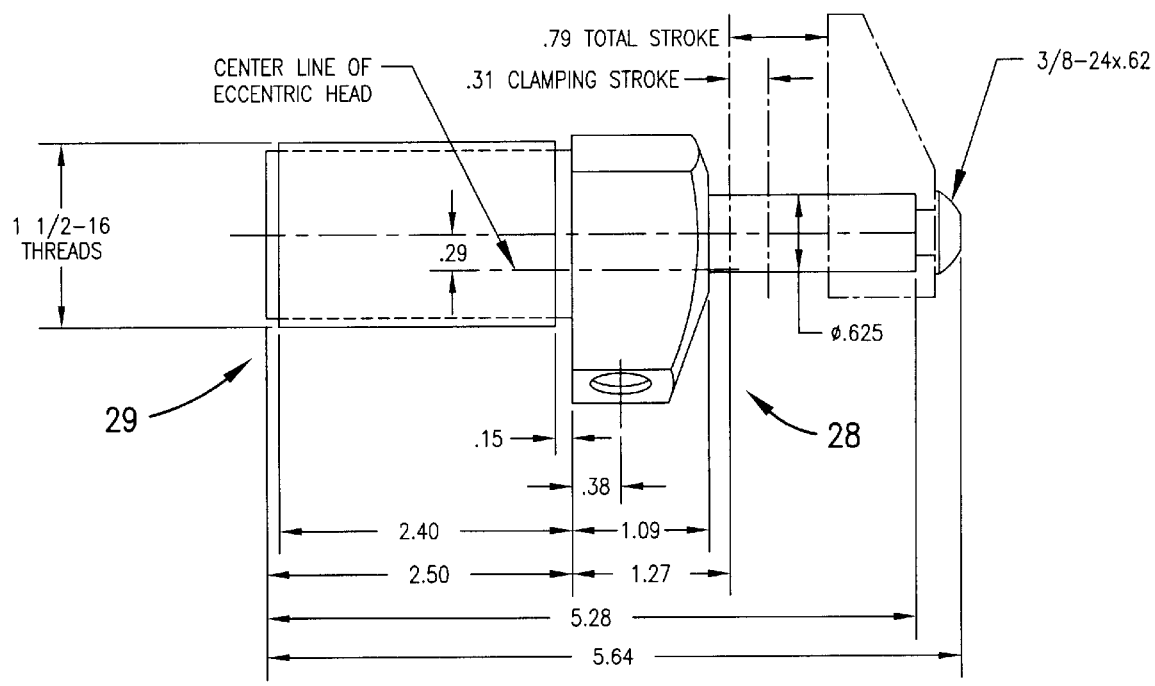
FIG. 4 is an elevation view of one of the workholding devices shown in FIGS. 2 and 3, wherein is shown the complexities of dimensions, clearances, tolerances, and mounting geometry that are modeled and automatically accounted for by the present invention.

Referring also to FIG. 4, dimensions and mounting geometry of an exemplary swing clamp device 28 are shown. As can be seen from the figure, a lower portion 29 of this particular device 28 is threaded to facilitate mounting the device 28 on the support structure 26. An upper portion of the device 28 is movable or swingable, thereby necessitating that clearances and interferences be considered when placing the device 28. The threaded lower portion 29 defines this particular device's mounting geometry and hole pattern. For other devices, such as, for example, work supports, swing clamps, special use clamps, edge clamps, collet vises and other types of swing clamps, which may be electric, hydraulic, or manual in nature, more complex mounting geometries having multiple holes of different sizes, including, for example, tapped holes, clearance holes, and threaded holes, may be required. Again, the present invention is unconcerned with the nature or form of the devices 28 so long as a computer or virtual model thereof may be created and stored electronically.

From FIG. 4, the complexity of dimensions, clearances, and tolerances, and mounting geometry associated with each device 28 can be appreciated. Although, in the prior art, a workholding concept designer would need to mentally and manually account for such considerations, the present invention advantageously does so automatically and without undue human consideration or intervention, thereby streamlining and simplifying selection, placement, and testing of the positioning of the devices 28 and overall development of the workholding concept.

It is within the ability of one with ordinary skill in the computer programming arts to code the computer program described herein. The computer program comprises a combination of code segments that may be written in any suitable programming language, such as, for example, Java or C++, and stored in or on any suitable computer-readable memory medium, such as, for example, a hard drive or compact disk, and executed by the computing device 30.

Figure 5:
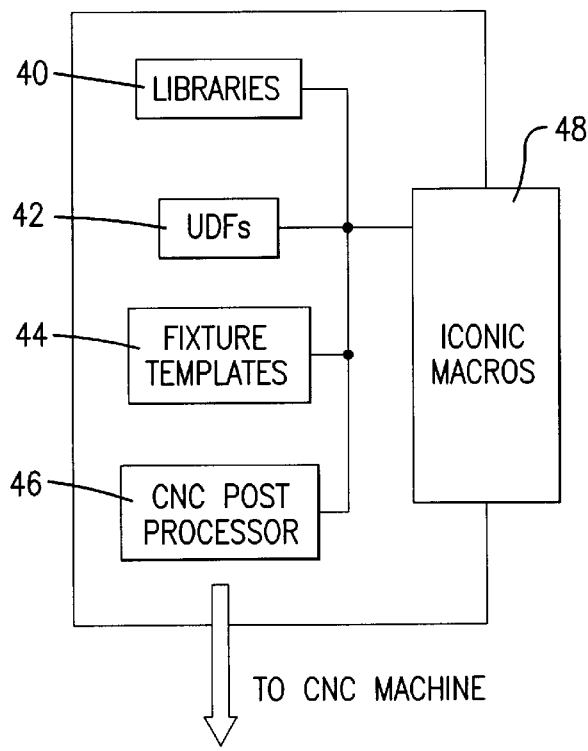
FIG. 5 is a block diagram of components of a preferred embodiment of the computer program of the present invention.

In the preferred embodiment, referring also to FIG. 5, the computer program comprises code segments relating to one or more fixture templates 44; one or more predefined libraries 40 of support structures 26, device models 28, and associated processes; one or more user defined features (UDFs) 44; and iconic macros 48. The program links to a CNC post processor 46 and may even include a generic CNC post processor.

The fixture templates 44 are generic templates or models provided to facilitate standardization in and streamlining of the design process. The templates 44 can be preset with operation parameters, site parameters, manufacturing parameters, work cell definitions, tooling definitions, PPRINT settings, and any other setting that may have to be performed with each new CNC program. These parameters allow the user to globally set default manufacturing parameters, which expedites and standardizes the process of generating CNC program sequences. Manufacturing parameters tie the manufacturing UDFs 42 to the CNC post processor 46, thereby facilitating a high level of automation by allowing the user to easily input information such as, for example, a CNC program name, a material (e.g., aluminum, cast iron, stainless steel, tool stell), a maximum machining depth, and a machine load (e.g., light, medium, heavy). Thus, rather than beginning each new fixture design from scratch, the user will begin with an existing template 44 and change default parameters or otherwise adapt it as needed.

The pre-defined libraries 40 contain a plurality of computer or virtual models of a variety of support structures 26 and locating and clamping devices 28, as well as their associated dimensions and mounting geometries. This allows the the user to conveniently select a desired support structure 26 and one or more desired devices 28 from the library 40. Because the dimensions and mounting geometries are represented in the models, the computer program is advantageously able to check for tolerances, clearances, and interferences between the support structure 26, the devices 28, and the workpiece 24.

The devices 28 are modeled using a modeling standard under which all mounting holes may be defined as members of a hole pattern, which reduces the number of UDFs 42. Each UDF 42 can initially be placed referencing a lead member of the hole pattern, and automatically apply itself to the remaining members of the hole pattern. If a standard hole pattern cannot be used to represent an irregular placement of the hole pattern members, then hole pattern tables are used. Furthermore, the lead member of each hole pattern will contain or otherwise be associated with a name or other identifier that describes the type of hole. This feature aids the computer program later in creating the CNC program.

Additionally, as mentioned, all models of clamping or otherwise movable devices 28 will contain appropriate parameters and relations to allow the computer program to check for proper clearances and interferences. Additionally, where applicable, each model will contain features which represent, for example, the point of clamping contact, and which can be used to more easily position the device 28. Additionally, the computer program uses design variation tables whenever possible, which, it will be appreciated, allows the user to easily replace devices 28 to review a number of design scenarios.

The UDFs 42 are used to capture design and manufacturing intent in a form that can be applied to new designs. Some UDFs 42 are associated with design and are used to automatically populate the fixture model with the selected device's mounting geometry, including, for example, tapped holes, clearance holes, and threaded holes. Other UDFs 42 are associated with manufacture and are used to automatically generate the CNC program required to machine the mounting geometry into or onto the fixture. Each design UDF 42 will be associated with one or more manufacturing UDFs 42 to implement the design.

For example, the design UDF 42, named "mc__11.gph", corresponds to a clearance hole for a particular clamping device and requires spot drilling, drilling, and milling sequences. As it may be more efficient in this case to group the drilling sequences, two manufacturing UDFs 42 may be associated with this design UDF 42. A first manufacturing UDF 42, named "mc__11__nc.gph", provides a CNC program code segment to implement the spot drill and drill all locations and mill a clearance hole at a first location; a second manufacturing UDF 42, named "mc__11__2__nc.gph", mills the clearance holes in all other locations.

The CNC Post Processor 46 is used to output the correctly formatted or otherwise adapted CNC program code for the particular type or brand of CNC machine being used to machine the fixture 22, thereby allowing the present invention to accommodate a variety of different CNC machines.

Figure 6:
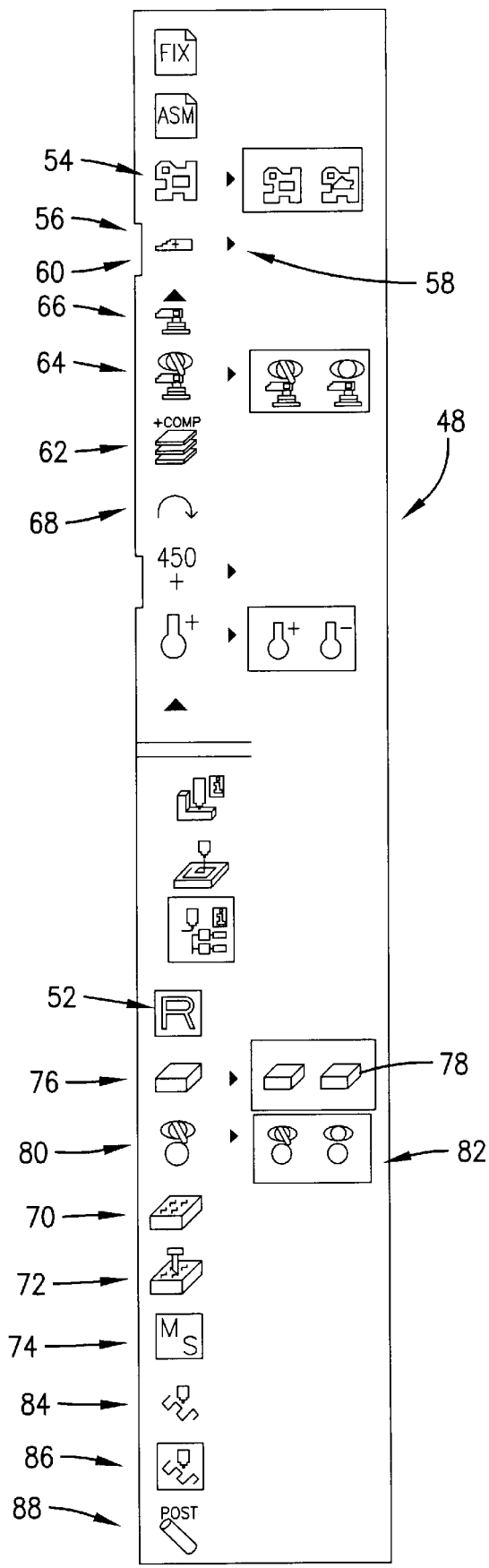
FIG. 6 is a screen capture of an iconic macro component of the block diagram of FIG. 5.

The iconic macros 48 are a graphical user interface (GUI) provided to streamline the design and CNC program generation processes. Referring also to FIG. 6, a number of selectable macros 48 are provided, including a Regenerate icon 52; an Assembly icon 54; a Swing Clamp icon 56; a Work Support icon 58; an End Effector icon 60; an Add Components icon 62; a Blank Components icon 64; an Unblank Components icon 66; a Modify Placement icon 68; an Update icon 70; a CNC Program Generation icon 72; a Modify CNC Sequence icon 74; a Display Workpiece 76 icon; a Blank Workpiece icon 78; a Blank Manufacturing icon 80; an Unblank Manufacturing icon 82; a Display Tool motion icon 84; a Display Shaded Tool motion icon 86; and a Post Processor icon 88. Electronic selection of these icons, as with, for example, a computer mouse or pointer, results in initiation of the following respective functions:

| | |
|---|---|
| Regenerate icon 52 | regenerates the displayed model and allows for access to the model's parameters. |
| Assembly icon 54 | initiates process of developing a workholding concept. |
| Swing Clamp icon 56, | allows for selection and assembly of a swing clamp device. |
| Work Support icon 58 | allows for selection and assembly of a work support device |
| End Effector icon 60 | allows for selection and assembly of an end effector device. |
| Add Components icon 62 | adds an indicated device to the COMPONENTS layer. |
| Blank Components icon 64 | blanks an indicated device on the COMPONENTS layer. |
| Unblank Components icon 66 | unblanks an indicated device on the COMPONENTS layer. |
| Modify Placement icon 68 | modifies the placement, with respect to the fixture, of an assembled device. |
| Update icon 70 | runs a utility program that automatically updates the support structure with the indicated device's mounting geometry. |
| CNC Program icon 72 | runs a utility program that automatically generates the CNC program required to machine the device mounting geometry into the support structure. |
| Modify CNC Sequence icon 74 | allows for modification of an existing CNC program sequence. |
| Display Workpiece icon 76 | displays the workpiece. |
| Blank Workpiece icon 78 | blanks the workpiece from the display. |
| Blank Manufacturing icon 80 | blanks all manufacturing "mill volumes" and "mill surfaces" from the display. |
| Unblank Manufacturing icon 82 | unblanks all manufacturing mill volumes and mill surfaces. |
| Display Tool Motion icon 84 | displays a simulation of tool motion which will result from the CNC program. |
| Display Shaded Tool Motion icon 86 | utilizes PrO/NC-CHECK to display, in a shaded mode, tool motion associated with the CNC program. |
| Post Processor icon 88 | invokes the post processor to format and otherwise adapt the CNC program for the particular CNC machine. |

In use and operation, the present invention functions as follows. First, just as in the prior art, a workholding concept must be developed for locating and securing the workpiece 24 during machining, welding, assembly, or other similar operations. In the present invention, however, such development is substantially streamlined through computer-based automation using virtual components and simulations. By selecting the Assembly icon 54 from the iconic macro 48, the development process is initiated. A fixture template 44 may be electronically selected to provide a convenient starting point from which to continue the design process. Default parameters provided by the fixture template 44, including support structure material type, maximum machining depth, and maximum load, may be changed as desired or necessary for the current design. The user may, for example, modify these default parameters to accommodate lighter or heavier machining loads. The support structure material defined in the fixture template 44 establishes the initial set of machining speeds and feeds which can thereafter be modified from the default "medium" settings to "light", wherein all speeds and feeds are reduced by 25%, or "heavy", wherein all speeds and feeds are increased by 25%. These settings and other parameters can be changed by the user at any time.

Figure 7:
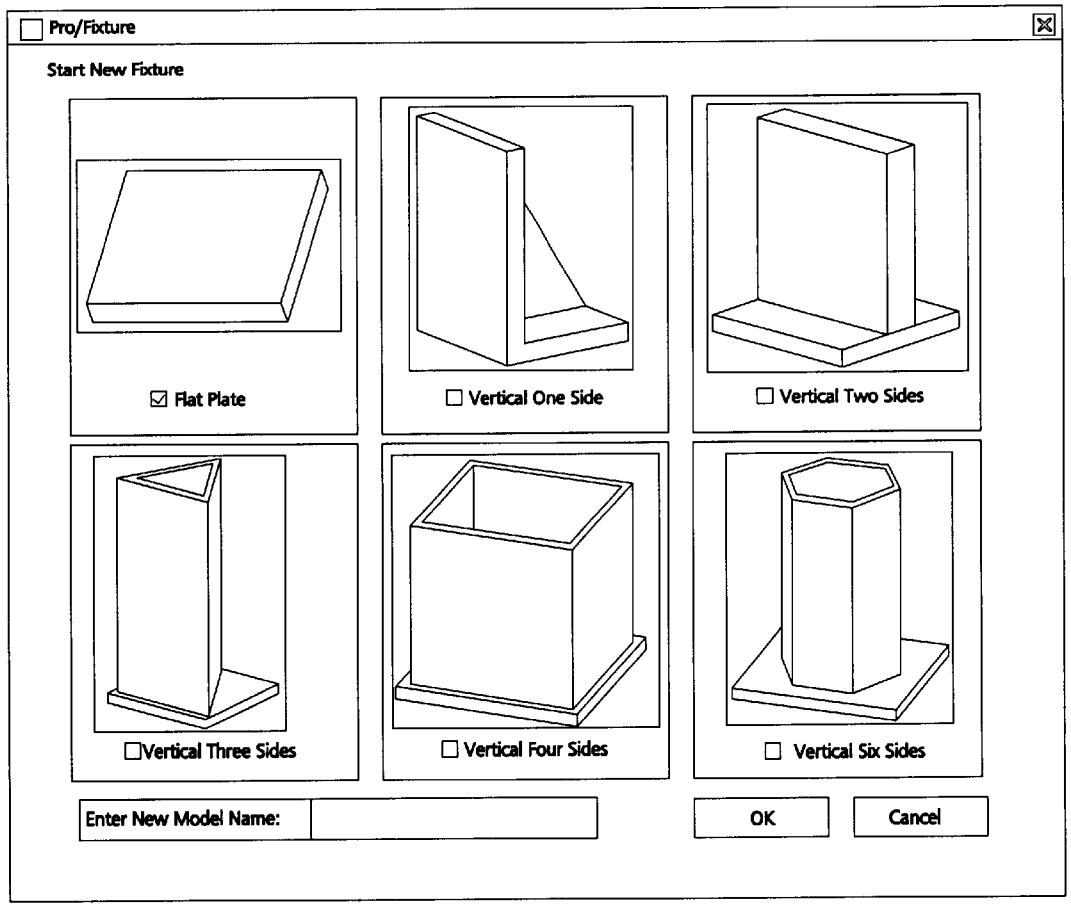
FIG. 7 is a screen capture of a display generated by the computer program of the present invention, wherein the display shows a variety of selectable support structures.

Referring also to FIG. 7, a screen 90 may be made to appear allowing for electronic selection of an appropriate computer-modeled or virtual support structure 26 from a displayed variety of such support structures. The selected support structure 26 may be named for easier future reference.

Figure 8:
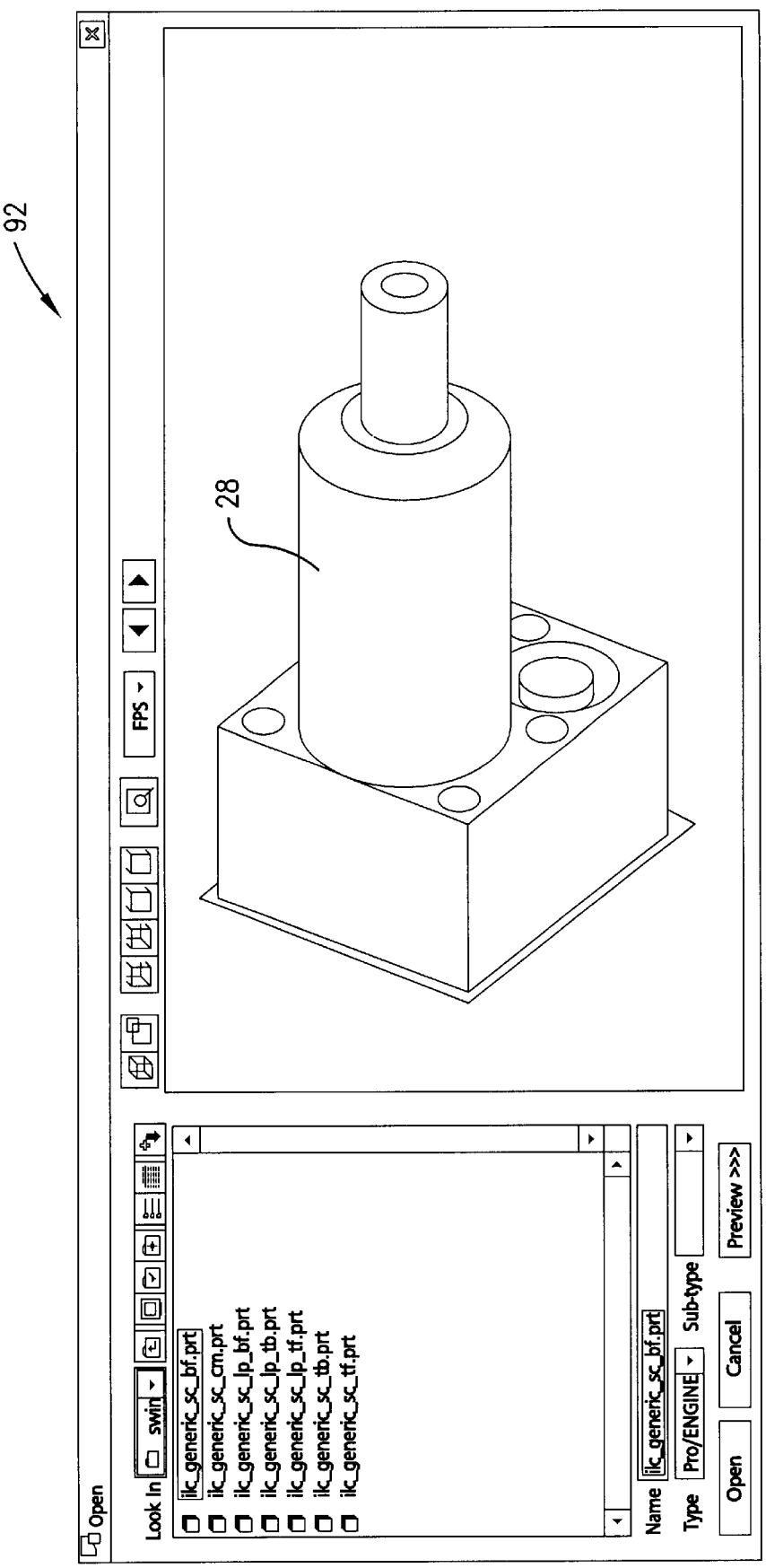
FIG. 8 is a screen capture of a display generated by the computer program of the present invention, wherein the display shows a selected device.

Referring also to FIG. 8, once a support structure 26 is selected, a screen 92 may be made to appear allowing for electronic selection of one or more appropriate computer-modeled or virtual locating or clamping devices 28 from a displayed variety of such devices. Once selected, the device 28 can be positioned on the selected support structure 26 in a manner sufficient to adequately and safely locate and secure the workpiece 24. Selecting the Swing Clamp icon 56, for example, displays a screen of all modeled devices of that type, allowing for electronic selection and arrangement on the support structure 26 of a particular swing clamp device 28. Similarly, selection of the Work Support icon 58 or the End Effector icon 60 displays screens of all modeled devices of those types, allowing for electronic selection and arrangement on the support structure 26 of, respectively, a work support device or an end effector device.

Figure 9:
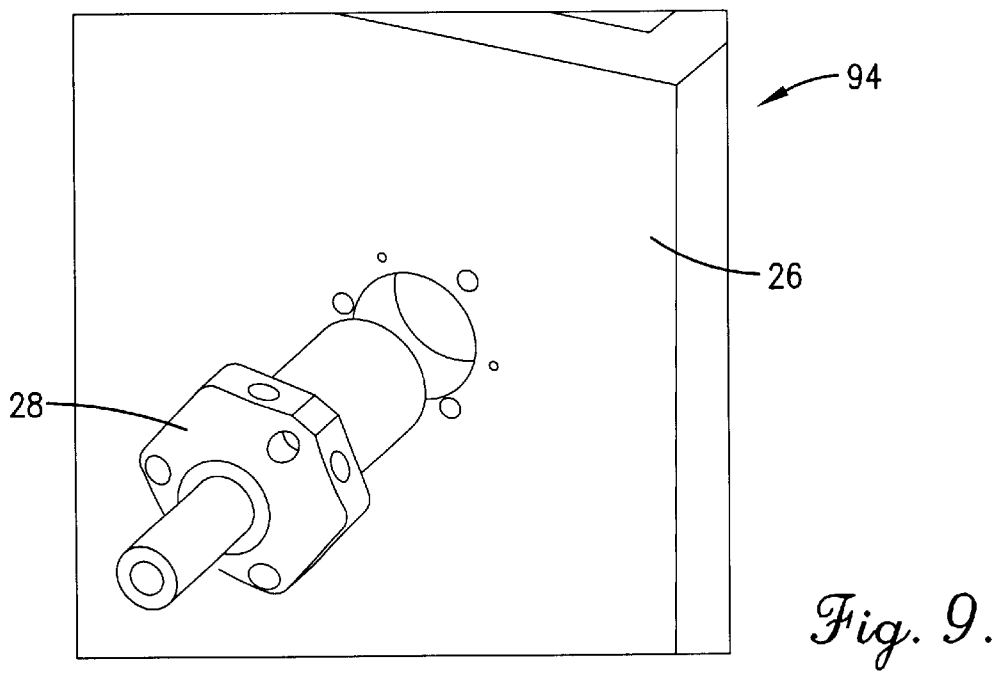
FIG. 9 is a screen capture of a display generated by the computer program of the present invention, wherein the display shows a mounting geometry of a selected device having been applied to a selected support structure.

Unlike in the prior art, where selection of the support structure 26 and selection and arrangement of the devices 28 was a non-standardized process requiring substantial experience and knowledge of various physical characteristics and parameters, the present invention includes the libraries 40 of standardized device models which conveniently provide all dimensions, mounting geometry, clearance, and interference information for each device 28. Thus, the appropriateness of a device choice may be tested immediately and definitively so that, if necessary, a substitution may be made before any further progress in the process occurs. Referring to FIG. 9, once a selected device 28 has been verified, selecting the Update icon 70 results in an update of the support structure 26 with the indicated device's mounting geometry, as shown on the screen display 94.

In the prior art, once the workholding concept was complete, it had to be laboriously implemented. This required that detailed design drawings be produced by a draftsman, wherein would be shown and identified each locating and clamping device 28 to be attached to the support structure 26. The drawings also had to show and dimension each device's fastening feature, hole pattern, or other mounting geometry, and the mounting geometries for all of the devices 28 had to be dimensionally referenced to a common locating axis on the support structure 26 for ease of manufacturability purposes.

By selecting the Update icon 70, the present invention advantageously and efficiently combines development of the workholding concept with production of the fixture drawings. Because development of the workholding concept is computerized and integrated with CAD software, rapid and efficient development and testing of the workholding concept is possible along with simultaneous production of the fixture drawings of the finalized concept.

Then, in the prior art, the fixture drawing had to be implemented in a CNC program coded by a CNC programmer to direct and control the CNC machine 32 to machine the support structure 26 to accept the devices 28 and secure the workpiece 24. Additionally, the CNC programmer would develop a tooling list to be used by the CNC machine to more efficiently machine the support structure 26.

In the present invention, however, selection of the CNC Program icon 72 automatically generates the CNC program based on the fixture model. This advantageously eliminates the human CNC programmer and any risks of transposition or other coding errors, as the program is created by the computer itself. Furthermore, the present invention will automatically apply existing Manufacturing User Defined Features (MUDFs) to the CNC program. Additionally, a variety of supporting documentation and drawings may also be automatically generated, including, for example, a tooling list of tools called for by the CNC program. The CNC program and tooling list are optimized to maximize use of each tool before it needs to be replaced with another.

Next, in the prior art, a machine operator would prepare the machining operation for making the support structure 26, including loading any required tooling and carefully stepping through each hole pattern operation to ensure that each pattern will be properly made in accordance with the fixture drawing. This was necessary because typically there would be constructed only one unique support structure 26 for each type of workpiece 24 to be held, regardless of the actual number of workpieces. Therefore, every step, from development of the workholding concept, production of the fixture drawing, programming of the CNC program, and machining of the support structure, needed to be absolutely correct. Stepping through the tool motion helped to ensure such correctness.

In the present invention, verification of the CNC code may not be needed as it results directly from the tested workholding concept. Nevertheless, selection of the Display Tool Motion icon 84 or Display Shaded Tool Motion icon 86 causes to be displayed for viewing and verification simulated tool motion corresponding to the generated CNC program. Thus, the CNC program is more easily verified without needing to involve the CNC machine itself. This is particularly advantageous where the CNC machine is located remotely from where the CNC program is generated. Should it be desirable or necessary to modify some portion of the CNC program, selection of the Modify CNC Sequence icon 74 allows for such.

Once the CNC program is generated, it must be formatted or otherwise adapted for the particular type or brand of CNC machine being used. The CNC post processor 46 accomplishes this automatically with selection of the Post Processor icon 88 which provides access to a Post Processor.

Once the support structure 26 is machined and complete, the various locating and clamping devices 28 can be mounted, after which the fixture 22 is ready to hold the workpiece 24 for the machining, welding, or assembly processes.

From the preceding description, it will be appreciated that the present invention provides a number of substantial advantages over the prior art. For example, whereas the prior art process is slow, inefficient, and fraught with potential for human error, the present invention advantageously maximizes efficiency and minimizes or eliminates error risks by substantially automating and computerizing a great deal of the fixture design and manufacturing process. Furthermore, whereas the prior art process typically required the involvement of at least four people, including a workholding concept designer, a fixture drawing draftsman, a CNC program programmer, and a machine operator, the present invention advantageously and efficiently combines development of the workholding concept with production of the fixture drawings and generation of the machine program, thereby eliminating the draftsman and the programmer and requiring, at most, only two people. This substantial simplification allows for participation of third-parties, such as customers, in the design and manufacturing process.

Additionally, whereas lead time for the prior art process could easily reach or exceed four weeks (not including time required to correct errors), the method of the present invention advantageously reduces lead time to a few days, thereby reducing the design-to-build time by as much as 80%.

In another embodiment of the invention, a user may select a workpiece and one or more clamping devices to hold the workpiece before selecting an appropriate support structure. Specifically, the user first selects and displays a workpiece and then selects and displays one or more clamping devices to hold the workpiece. A support structure is then selected on which to mount the clamping devices and workpiece.

The present invention may also include a Workholding Device Modeler that allows a fixture designer to quickly and easily decide which swing clamp is the most suitable to clamp a workpiece in a particular area. The Modeler displays "skeletons" or "footprints" of all standard, upreach, long-arm, double-arm, and other conventional swing clamp types. The Modeler allows the designer to easily switch from one swing clamp type to another to determine which one provides the best fit.

The invention may also include a file utility to help the designer manage the programs generated by the Post Processor. After the Post Processor executes, the designer is responsible for locating, renaming, and transferring the programs created by the Post Processor. The file utility automates this process. After the Post Processor creates a program, the file utility appears to allow the designer to view and/or edit the program, transfer the program to a particular directory or memory device, and view particular files of the Post Processor.

Although the invention has been described with reference to the preferred embodiments illustrated in the attached drawings, it is noted that equivalents may be employed and substitutions made herein without departing from the scope of the invention as recited in the claims. For example, the present invention is not limited to the design and manufacture of custom workholding fixtures, but is instead readily adaptable for use in many diverse applications involving computer-aided machining of mounting geometries, such as hole patterns and fastening features for other devices.

Having thus described the preferred embodiment of the invention, what is claimed as new and desired to be protected by Letters Patent includes the following:

1. A method of designing a custom workholding fixture for holding a workpiece to be worked upon, the method comprising the steps of:

(a) selecting a virtual support structure from an electronic display of a variety of virtual support structures;

(b) selecting a virtual device from an electronic display of a variety of virtual devices, wherein the virtual device is a model of an actual device operable to locate and secure the workpiece, and the model includes one or more dimensions and a mounting geometry of the actual device;

(c) positioning the selected virtual device on the selected virtual support structure;

(d) applying the mounting geometry of the tested virtual device to the virtual support structure; and (e) generating a control program for directing a computer-controlled machine to create an actual support structure based upon the virtual support structure and the applied mounting geometry.

2. The method as set forth in claim 1, further including the step of testing an appropriateness of the virtual device and an appropriateness of the positioning of the virtual device based on the one or more dimensions and on the mounting geometry.

3. The method as set forth in claim 1, wherein the variety of virtual devices includes clamping devices, work supports, and end effectors.

4. The method as set forth in claim 1, further including the step of (p) simulating, in a virtual environment, operation of the computer-controlled machine so as to verify the control program.

5. The method as set forth in claim 1, further comprising the step of (g) formatting the control program so as to adapt it for use with a particular computer-controlled machine.

6. The method as set forth in claim 5, wherein the act of formatting is performed by a post-processor.

7. A method of designing a custom workholding fixture for holding a workpiece to be worked upon, the method comprising the steps of:
   (a) selecting a virtual support structure from an electronic display of a variety of virtual support structures;
   (b) selecting a virtual device from an electronic display of a variety of virtual devices, wherein the virtual device is a model of an actual device operable to locate and secure the workpiece, and the model includes one or more dimensions and a mounting geometry of the actual device;
   (c) positioning the selected virtual device on the selected virtual support structure;
   (d) testing an appropriateness of the virtual device and an appropriateness of the positioning of the virtual device based on the one or more dimensions and on the mounting geometry;
   (e) applying the mounting geometry of the tested virtual device to the virtual support structure;
   (f) generating a control program for directing a computer-controlled machine to create an actual support structure based upon the virtual support structure and the applied mounting geometry;
   (g) simulating in a virtual environment, operation of the computer-controlled machine so as to verify the control program; and
   (h) formatting the control program so as to adapt it for use with a particular computer-controlled machine, wherein the act of formatting is performed by a post processor.

8. The method as set forth in claim 7, wherein the variety of virtual devices includes clamping devices, work supports, and end effectors.

9. A computer program for facilitating design of a custom workholding fixture for holding a workpiece to be worked upon, wherein the computer program is stored on a memory device and executable by a computing device, the computer program comprising:
   a code segment for displaying a variety of virtual support structures and for allowing a user to select a virtual support structure therefrom;
   a code segment for displaying a variety of virtual devices and for allowing the user to select a virtual device, wherein each of the variety of virtual devices is a model of an actual device operable to locate and secure the workpiece, and the model includes one or more dimensions and a mounting geometry of the actual device;
   a code segment for allowing the user to position the selected virtual device on the selected virtual support structure;
   a code segment for applying the mounting geometry of the virtual device to the virtual support structure; and
   a code segment for generating a control program for directing a computer-controlled machine to create an actual support structure based upon the virtual support structure and the applied mounting geometry.

10. The computer program as set forth in claim 9, further including a code segment for testing an appropriateness of the virtual device and an appropriateness of the positioning of the virtual device based on the one or more dimensions and on the mounting geometry.

11. The computer program as set forth in claim 10, wherein the variety of virtual devices includes clamping devices, work supports, and end effectors.

12. The computer program as set forth in claim 10, further including a code segment for allowing the user to simulate, in a virtual environment, operation of the computer-controlled machine so as to verify the control program.

13. The computer program as set forth in claim 10, further including a code segment for formatting the control program so as to adapt it for use with a particular computer-controlled machine.

14. The computer program as set forth in claim 13, wherein the act of formatting is performed by a post-processor.

15. A computer program for facilitating design of a custom workholding fixture for holding a workpiece to be worked upon, wherein the computer program is stored on a memory device and executable by a computing device, the computer program comprising:
   a code segment for displaying a variety of virtual support structures and for allowing a user to select a virtual support structure therefrom;
   a code segment for displaying a variety of virtual devices and for allowing the user to select a virtual device, wherein each of the variety of virtual devices is a model of an actual device operable to locate and secure the workpiece, and the model includes one or more dimensions and a mounting geometry of the actual device;
   a code segment for allowing the user to position the selected virtual device on the selected virtual support structure;
   a code segment for testing an appropriateness of the virtual device and an appropriateness of the positioning of the virtual device based on the one or more dimensions and on the mounting geometry;
   a code segment for applying the mounting geometry of the tested virtual device to the virtual support structure;
   a code segment for generating a control program for directing a computer-controlled machine to create an actual support structure based upon the virtual support structure and the applied mounting geometry;
   a code segment for allowing the user to simulate, in a virtual environment, operation of the computer-controlled machine so as to verify the control program; and
   a code segment for formatting the control program using a post processor so as to adapt it for use with a particular computer-controlled machine.

16. The computer program as set forth in claim 15, wherein the variety of virtual devices includes clamping devices, work supports, and end effectors.

17. A method of designing a custom workholding fixture for holding a workpiece to be worked upon, the method comprising the steps of:
   (a) selecting a virtual device from an electronic display of a variety of virtual devices, wherein the virtual device is a model of an actual device operable to locate and secure the workpiece, and the model includes one or more dimensions and a mounting geometry of the actual device;

(b) selecting a virtual support structure from an electronic display of a variety of virtual support structures;

(c) positioning the selected virtual device on the selected virtual support structure;

(d) applying the mounting geometry of the tested virtual device to the virtual support structure; and (e) generating a control program for directing a computer-controlled machine to create an actual support structure based upon the virtual support structure and the applied mounting geometry.

18. A computer program for facilitating design of a custom workholding fixture for holding a workpiece to be worked upon, wherein the computer program is stored on a memory device and executable by a computing device, the computer program comprising:

a code segment for displaying a variety of virtual devices and for allowing the user to select a virtual device, wherein each of the variety of virtual devices is a model of an actual device operable to locate and secure the workpiece, and the model includes one or more dimensions and a mounting geometry of the actual device;

a code segment for displaying a variety of virtual support structures and for allowing a user to select a virtual support structure therefrom;

a code segment for allowing the user to position the selected virtual device on the selected virtual support structure;

a code segment for applying the mounting geometry of the virtual device to the virtual support structure; and a code segment for generating a control program for directing a computer-controlled machine to create an actual support structure based upon the virtual support structure and the applied mounting geometry.

* * * * *